United States Patent
Hata et al.

(10) Patent No.: US 9,924,335 B2
(45) Date of Patent: Mar. 20, 2018

(54) COMMUNICATION DEVICE, COMMUNICATION METHOD, AND STORAGE MEDIUM STORING COMMUNICATION PROGRAM

(71) Applicant: KYOCERA CORPORATION, Kyoto-shi, Kyoto (JP)

(72) Inventors: Mitsutaka Hata, Yokohama (JP); Emi Watanabe, Yonezawa (JP); Shinji Kono, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 24 days.

(21) Appl. No.: 13/851,682

(22) Filed: Mar. 27, 2013

(65) Prior Publication Data
US 2013/0260728 A1  Oct. 3, 2013

(30) Foreign Application Priority Data
Mar. 28, 2012  (JP) .................................. 2012-074396

(51) Int. Cl.
H04M 3/42 (2006.01)
H04W 4/16 (2009.01)

(52) U.S. Cl.
CPC .................................... *H04W 4/16* (2013.01)

(58) Field of Classification Search
CPC .... H04W 4/16; G06F 3/0482; G06F 3/04842; G06F 3/0488
USPC ...... 455/416, 417, 414.1, 412.1, 412.2, 420, 455/436, 567
See application file for complete search history.

(56) References Cited

U.S. PATENT DOCUMENTS

| | | | |
|---|---|---|---|
| 6,377,816 B1* | 4/2002 | Shinoda | H04B 1/406 455/553.1 |
| 2008/0165160 A1 | 7/2008 | Kocienda et al. | |
| 2008/0242356 A1* | 10/2008 | Marui | H04M 1/72583 455/566 |
| 2011/0193805 A1* | 8/2011 | Park | G06F 1/1692 345/173 |
| 2011/0244843 A1* | 10/2011 | Shostak | H04W 4/04 455/417 |
| 2011/0274104 A1* | 11/2011 | Cozzi | H04W 4/021 370/352 |

(Continued)

FOREIGN PATENT DOCUMENTS

JP  4341054 A  11/1992
JP  595467 A   4/1993

(Continued)

OTHER PUBLICATIONS

Office Action dated Dec. 3, 2013, corresponds to Japanese patent application No. 2012-74396, for which an explanation of relevance is attached.

(Continued)

*Primary Examiner* — Kathy Wang-Hurst
*Assistant Examiner* — Said Elnoubi
(74) *Attorney, Agent, or Firm* — Hauptman Ham, LLP

(57) ABSTRACT

According to an aspect, a communication device includes: a first communication unit for performing communication using a first communication scheme; a second communication unit for performing communication using a second communication scheme; and a control unit for processing the incoming call based on a status of the second communication unit.

15 Claims, 13 Drawing Sheets

(56) References Cited

U.S. PATENT DOCUMENTS

| | | | |
|---|---|---|---|
| 2012/0007890 A1* | 1/2012 | Choi | G06T 11/60 345/635 |
| 2012/0133604 A1* | 5/2012 | Ishizuka | G06F 1/1624 345/173 |
| 2012/0172011 A1* | 7/2012 | Gupta | H04W 68/02 455/414.1 |

FOREIGN PATENT DOCUMENTS

| | | |
|---|---|---|
| JP | 6-284081 A | 10/1994 |
| JP | 7-111680 A | 4/1995 |
| JP | 7-212473 A | 8/1995 |
| JP | 9-191491 A | 7/1997 |
| JP | 10-164191 A | 6/1998 |
| JP | 200013872 A | 1/2000 |
| JP | 2000-201381 A | 7/2000 |
| JP | 2000-201382 A | 7/2000 |
| JP | 2000-228785 A | 8/2000 |
| JP | 2000-236581 A | 8/2000 |
| JP | 200125069 A | 1/2001 |
| JP | 2001-177870 A | 6/2001 |
| JP | 2001-211478 A | 8/2001 |
| JP | 2002-010351 A | 1/2002 |
| JP | 2002-152837 A | 5/2002 |
| JP | 2007-318378 A | 12/2007 |
| JP | 2011-254222 A | 12/2011 |
| JP | 2012-28986 A | 2/2012 |
| WO | 2008086302 A1 | 7/2008 |

OTHER PUBLICATIONS

Office Action corresponding to JP2012-074396, dated Aug. 13, 2012.

Office Action dated Jun. 2, 2015, corresponding to Japanese patent application No. 2012-212911, for which an explanation of relevance is attached.

Office Action in JP Application No. 2012-212911, dated Aug. 22, 2017, for which an explanation of relevance is attached. 4pp.

Office Action in JP Application No. 2012-212911, dated Jan. 19, 2016, for which an explanation of relevance is attached.

* cited by examiner

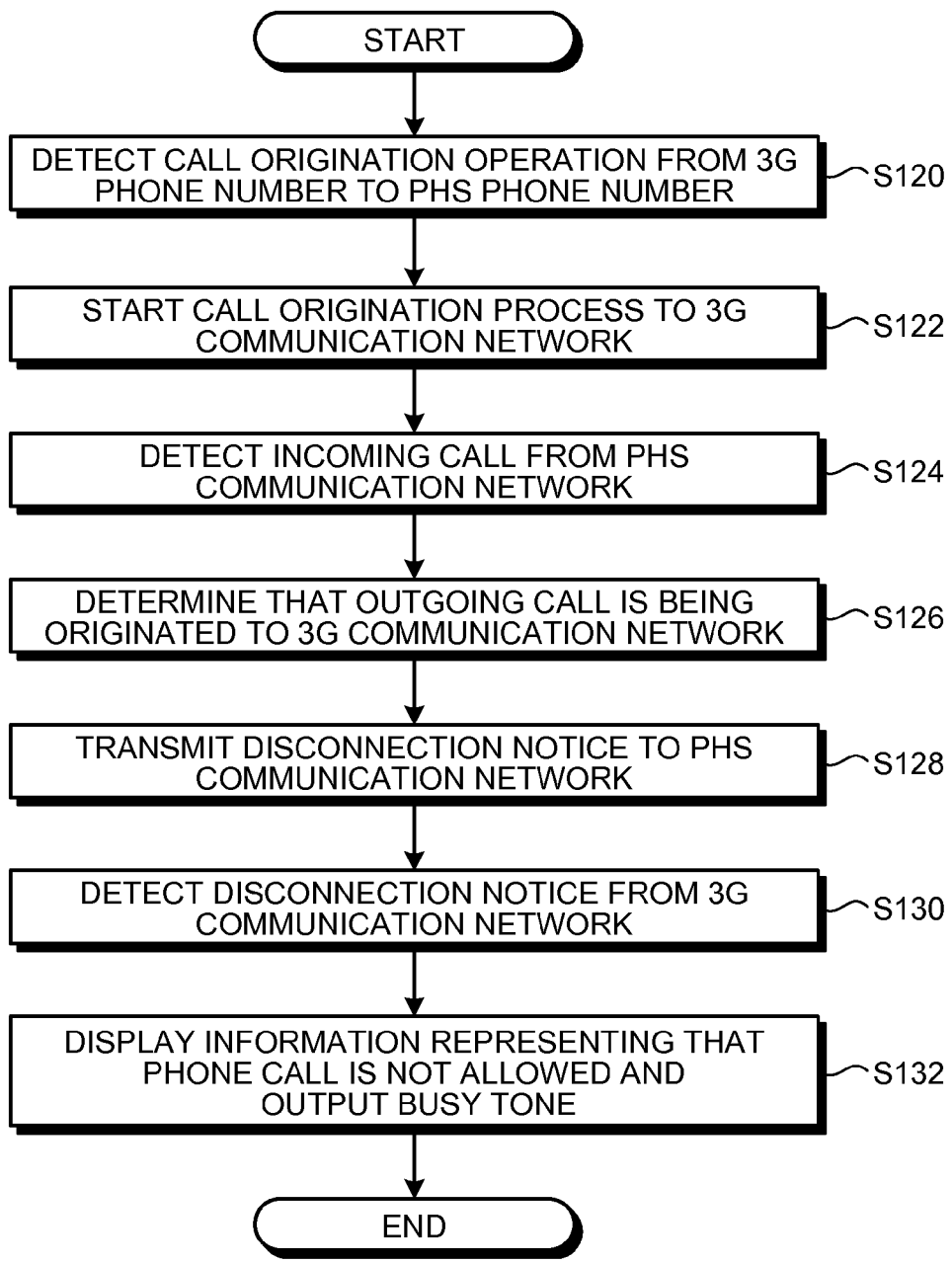

COMMUNICATION DEVICE, COMMUNICATION METHOD, AND STORAGE MEDIUM STORING COMMUNICATION PROGRAM

CROSS-REFERENCE TO RELATED APPLICATIONS

This application claims priority from Japanese Application No. 2012-074396, filed on Mar. 28, 2012, the content of which is incorporated by reference herein in its entirety.

BACKGROUND

1. Technical Field

The present application relates to a communication device, a communication method, and a storage medium storing therein a communication program. More particularly, the present application relates to a communication device including a touch screen, a method of controlling the communication device, and a storage medium storing therein a program for controlling the communication device.

2. Description of the Related Art

The communication devices include portable cellular phones such as mobile phones and PHS phones. As an example of such communication devices, touch screen devices having a touch screen are known. Examples of the touch screen devices include, but are not limited to, a smartphone. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

The communication devices such as mobile phones and PHS phones can perform communication including a phone call with another terminal using a communication network provided by a contracted communication service provider. Further, there are some communication devices that allow a user to select a communication line to be used from among a plurality of communication lines when starting a phone call.

For the foregoing reasons, there is a need for a communication device, a communication method, and a communication program, which are capable of improving operability of using a plurality of communication lines.

SUMMARY

According to an aspect, a communication device includes: a first communication unit for performing communication using a first communication scheme; a second communication unit for performing communication using a second communication scheme; and a control unit for processing the incoming call based on a status of the second communication unit.

According to another aspect, a communication device includes: a first communication unit for performing communication using a first communication scheme; a second communication unit for performing communication using a second communication scheme; a control unit for transmitting, when the second communication unit originates an outgoing call to the first communication unit and the first communication unit detects an incoming call corresponding to the outgoing call, a notice, which represents that the incoming call is not allowed, to the incoming call.

According to another aspect, a communication method is for a communication device including a first communication unit for performing communication using a first communication scheme and a second communication unit for performing communication using a second communication scheme. The communication method includes: detecting an in coming call by the first communication unit; detecting a status of the second communication unit upon detecting the incoming call; and processing the incoming call based on the status of the second communication unit.

According to another aspect, a non-transitory storage medium stores a communication program. When executed by a communication device including a first communication unit for performing communication using a first communication scheme and a second communication unit for performing communication using a second communication scheme, the communication program causes the communication device to execute: detecting an in coming call by the first communication unit; detecting a status of the second communication unit upon detecting the incoming call; and processing the incoming call based on the status of the second communication unit.

BRIEF DESCRIPTION OF THE DRAWINGS

FIG. 14 is a flowchart illustrating a processing procedure of control executed by the smartphone.

DETAILED DESCRIPTION

Exemplary embodiments of the communication device, the communication method, and the communication program according to the present application will be explained in detail below with reference to the accompanying drawings. A smartphone will be explained below as an example of the communication device provided with a touch screen.

Figure 1:
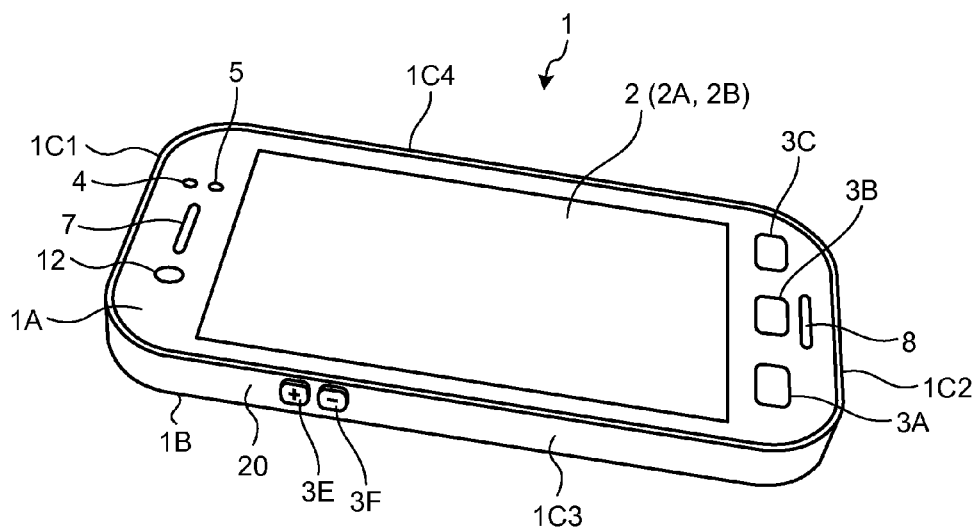
FIG. 1 is a perspective view of a smartphone according to an embodiment.
Figure 2:
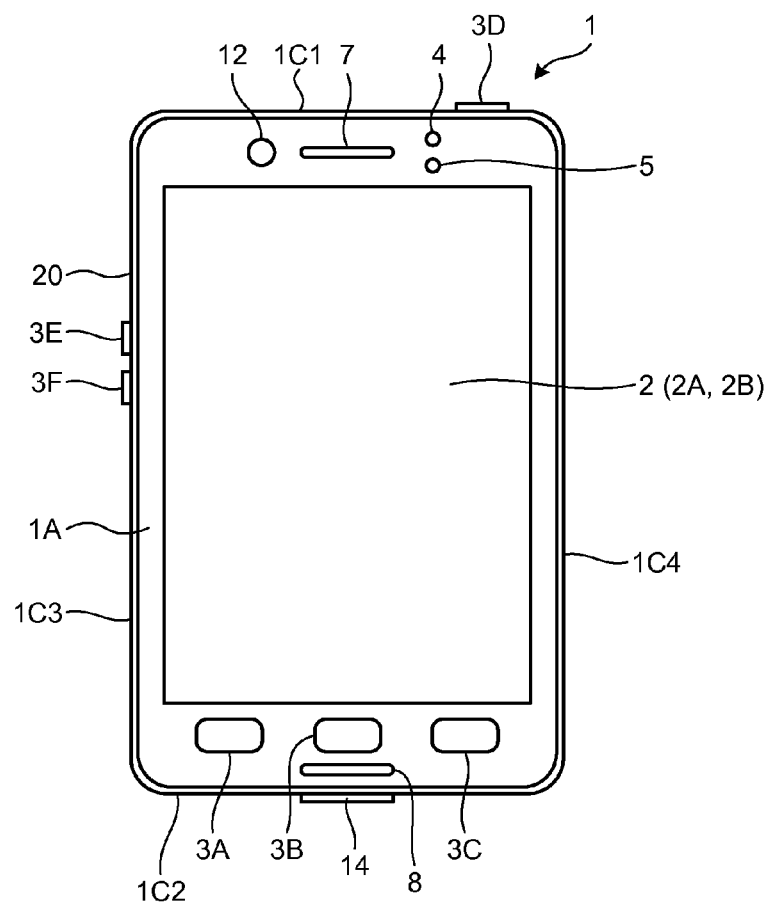
FIG. 2 is a front view of the smartphone.
Figure 3:
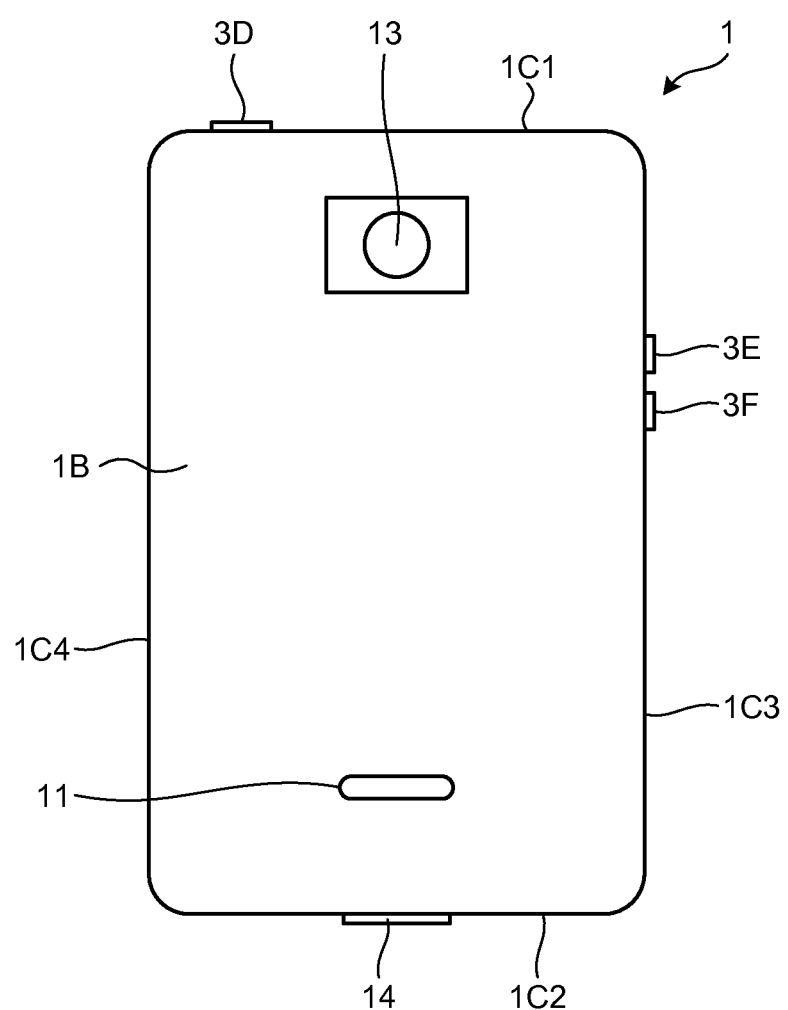
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, a pen, a stylus pen, or the like that contacts with the touch screen 2B may be called "contacting object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the present embodiment, a gesture performed with one finger may be called "single-touch gesture". In the present embodiment, a gesture performed with two fingers or more may be called "multi-touch gesture". The pinch in and the pinch out are the multi-touch gesture. The tap, the flick, the swipe, and the like are single-touch gestures if they are performed with one finger, and are multi-touch gestures if they are performed with two fingers or more.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
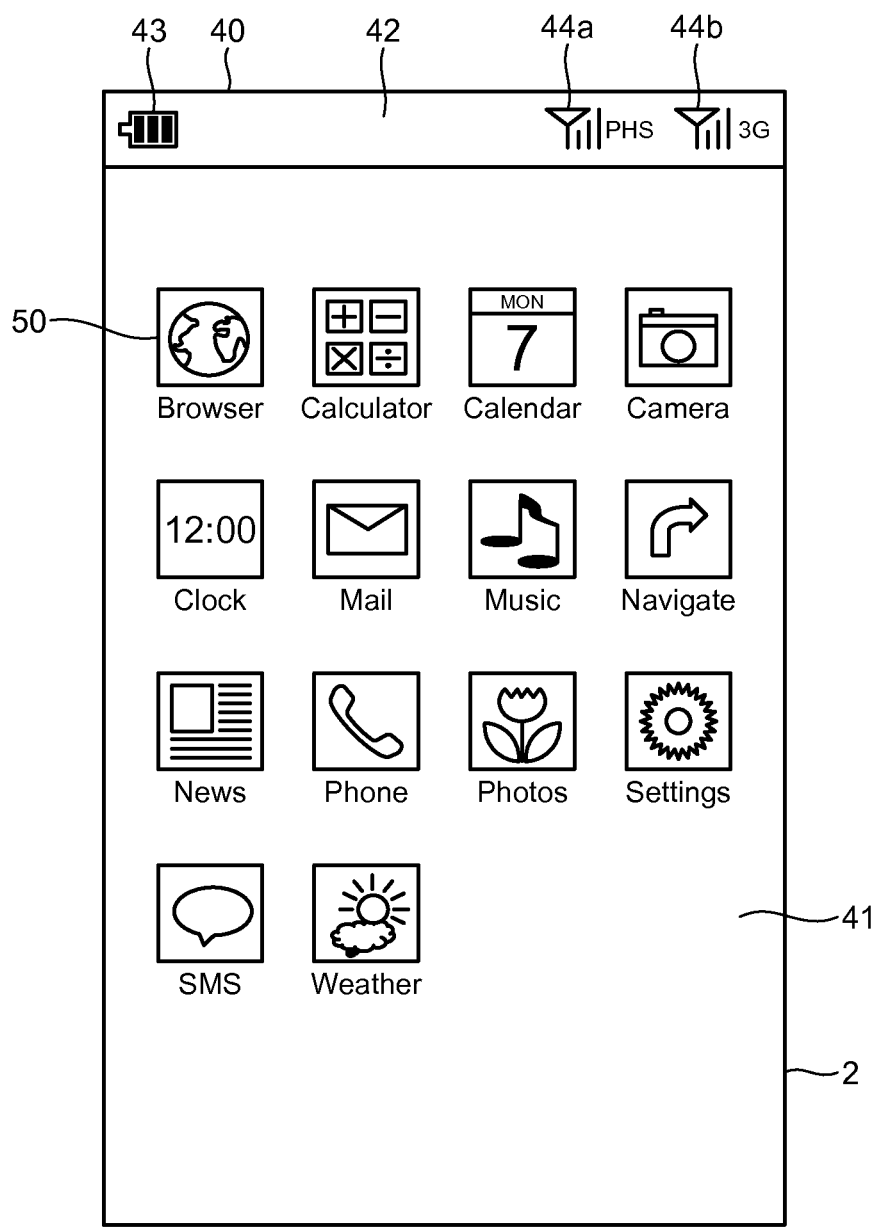
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply, a radio-wave level mark 44a indicating an electric field strength of radio wave for communication by a first communication unit 6A, and a radio-wave level mark 44b indicating an electric field strength of radio wave for communication by a second communication unit 6B. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

A vertical direction of the home screen 40 will be explained. In the following explanation, the vertical direction of the home screen 40 is determined based on a vertical direction of text or an image displayed on the touch screen display 2. Therefore, in the home screen 40 illustrated in FIG. 4, the side close to the area 42 in the longitudinal direction of the touch screen display 2 is the upper side, and the side far from the area 42 is the lower side. The side with the radio-wave level marks 44a and 44b displayed in the area 42 is the right side of the home screen 40, and the side with the remaining mark 43 displayed in the area 42 is the left side of the home screen 40.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
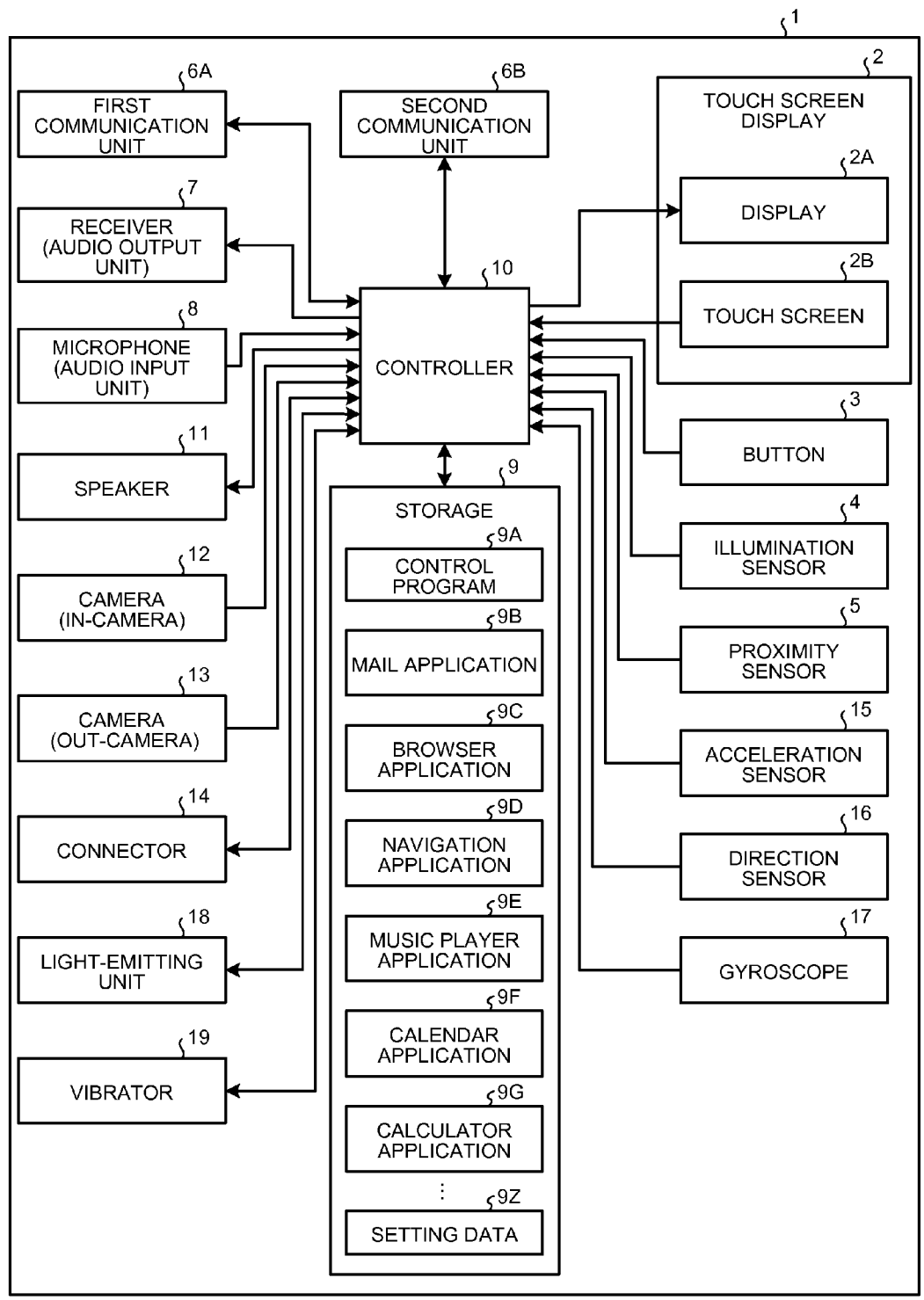
FIG. 5 is a block diagram of the smartphone.

FIG. 5 is a block diagram of the smartphone 1. The smartphone 1 includes the touch screen display 2, the button 3, the illumination sensor 4, the proximity sensor 5, the first communication unit 6A, the second communication unit 6B, the receiver 7, the microphone 8, a storage 9, a controller 10, the speaker 11, the cameras 12 and 13, the connector 14, an acceleration sensor 15, a direction (orientation) sensor 16, a gyroscope 17, a light-emitting unit 18, and vibrator 19.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The first communication unit 6A and the second communication unit 6B perform communication via radio waves. A communication system supported by the first communication unit 6A and the second communication unit 6B is wireless communication standard. In the present embodiment, the first communication unit 6A performs communication by the first communication scheme. Examples of the first communication scheme include, but are not limited to, a Personal Handy-phone System (PHS). The second communication unit 6B performs communication by the second communication scheme. Examples of the second communication scheme include, but are not limited to, a 3G system. For example, the second communication unit 6B supports at least one of Wideband Code Division Multiple Access (W-CDMA) and CDMA 2000. The wireless communication standard are not limited the above-mentioned systems. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC).

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the first communication unit 6A or the second communication unit 6B or through a non-transitory storage medium.

The storage 9 stores therein, for example, a control program 9A, the mail application 9B, a browser application 9C, a navigation application 9D, a music player application 9E, a calendar application 9F, a calculator application 9G, and setting data 9Z. The mail application 9B provides an electronic mail function of composing, sending, receiving, and displaying an e-mail. The browser application 9C provides a web browsing function for displaying a web page. The navigation application 9D provides a navigation function of guiding direction guidance. The music player application 9E provides a player function of playing back music to be output through the receiver 7 or the speaker 11. The calendar application 9F provides a calendar function for schedule management and the like. The calculator application 9G provides a calculator function of performing, for example, four arithmetic operations. The setting data 9Z includes information related to various kinds of settings related to an operation of the smartphone 1. For example, the setting data 9Z includes information related to a setting of making either a phone call implemented by controlling the first communication unit 6A and the like or a phone call implemented by controlling the second communication unit 6B and the like, and various kinds of conditions of call communication of the first communication unit 6A and the second communication unit 6B. In the following, for the sake of convenience of description, a call originating process of a phone call implemented by controlling the first communication unit 6A and the like may be referred to as "PHS call origination." A phone call implemented by controlling the first communication unit 6A and the like may be referred to as a "phone call using a PHS scheme." A call receiving process of a phone call implemented by controlling the first communication unit 6A and the like may be referred to "PHS call reception." A call originating process of a phone call implemented by controlling the second communication unit 6B and the like may be referred to as "3G call origination," and a phone call implemented by controlling the second communication unit 6B and the like may be referred to as a "phone call using a 3G scheme." A call receiving process of a phone call implemented by controlling the second communication unit 6B and the like may be referred to as "3G call reception."

The control program 9A provides a function related to various kinds of control for operating the smartphone 1. For example, a phone call is implemented such that the control program 9A controls the first communication unit 6A, the second communication unit 6B, the receiver 7, the microphone 8, and the like. The function provided by the control program 9A includes a function of executing various kinds of control, for example, of changing information displayed on the display 2A according to a gesture detected through the touch screen 2B. The function provided by the control program 9A can be used in combination with a function provided by another program such as the mail application 9B. The function provided by the control program 9A includes a function of controlling communication performed by the first communication unit 6A and the second communication unit 6B, particularly, a function of controlling call communication. Specifically, the function provided by the control program 9A includes a function of controlling call communication by one call unit based on a status of another call unit when call communication is performed through one of two communication units of the first communication unit 6A and the second communication unit 6B. The function provided by the control program 9A includes a function of informing of the fact that 3G call origination is to be performed when an operation of starting 3G call origination is received through the touch screen 2B. The function provided by the control program 9A includes a function of providing a user interface for receiving an operation of performing switching between the PHS scheme and the 3G scheme. The function provided by the control program 9A includes a function of providing a user interface for receiving an operation related to a phone call by a PHS line. The function provided by the control program 9A includes a function of providing a user interface for receiving an operation related to a phone call by a 3G line.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the first communication unit 6A, the second communication unit 6B, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

For example, the controller 10 executes the control program 9A to control communication, particularly, call communication, performed by the first communication unit 6A and the second communication unit 6B. The controller 10 executes the control program 9A to control call communication by one call unit based on a status of another call unit when call communication is performed through one of two communication units of the first communication unit 6A and the second communication unit 6B. The controller 10 executes the control program 9A to execute various kinds of control, for example, of informing of whether communication is to start using either of a PHS line and a 3G line when an operation of starting communication is received through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude. The light-emitting unit 18 includes, for example, a light emitting diode (LED) or the like, emits light in various colors. The vibrator 19 vibrate includes a motor or the like to vibrate the smartphone 1.

Part or all of the programs and the data stored in the storage 9 in FIG. 5 may be downloaded from any other device through communication by the first communication unit 6A and/or the second communication unit 6B. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Figure 6:
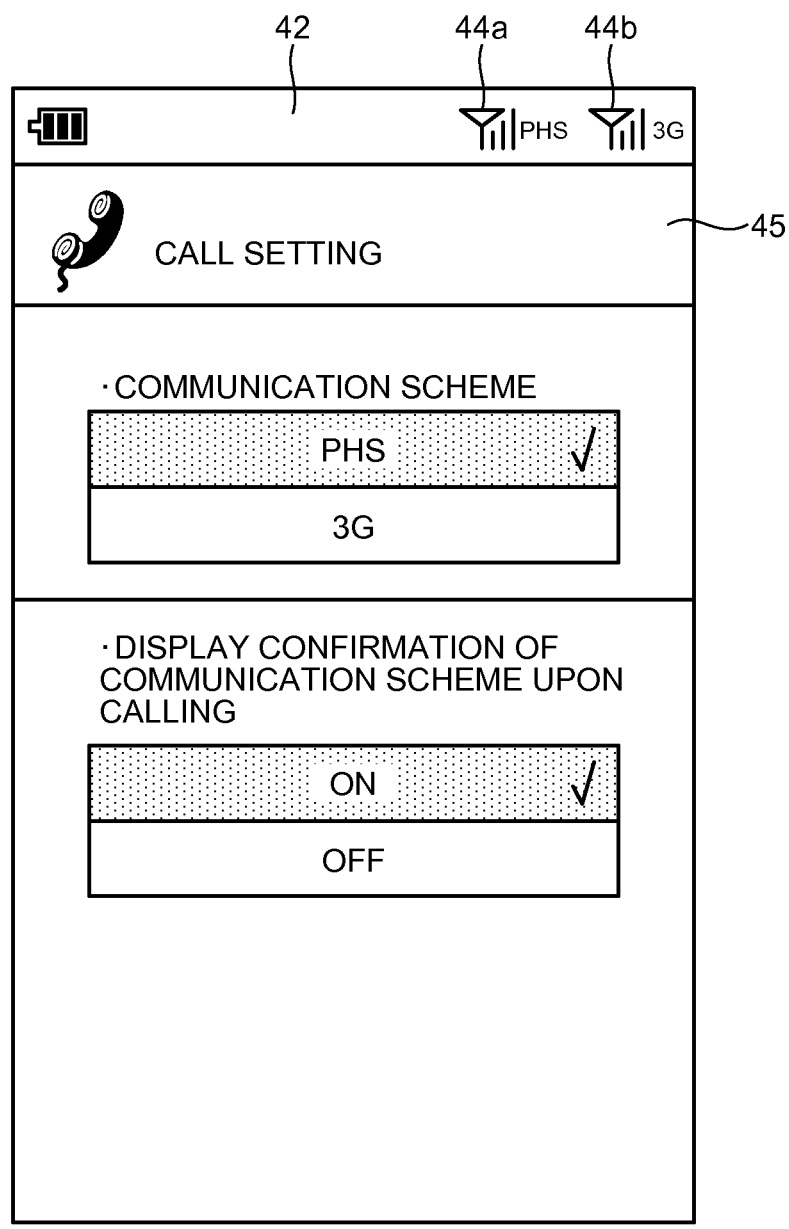
FIG. 6 is a diagram illustrating an example of a phone call setting user interface displayed on a display.
Figure 7:
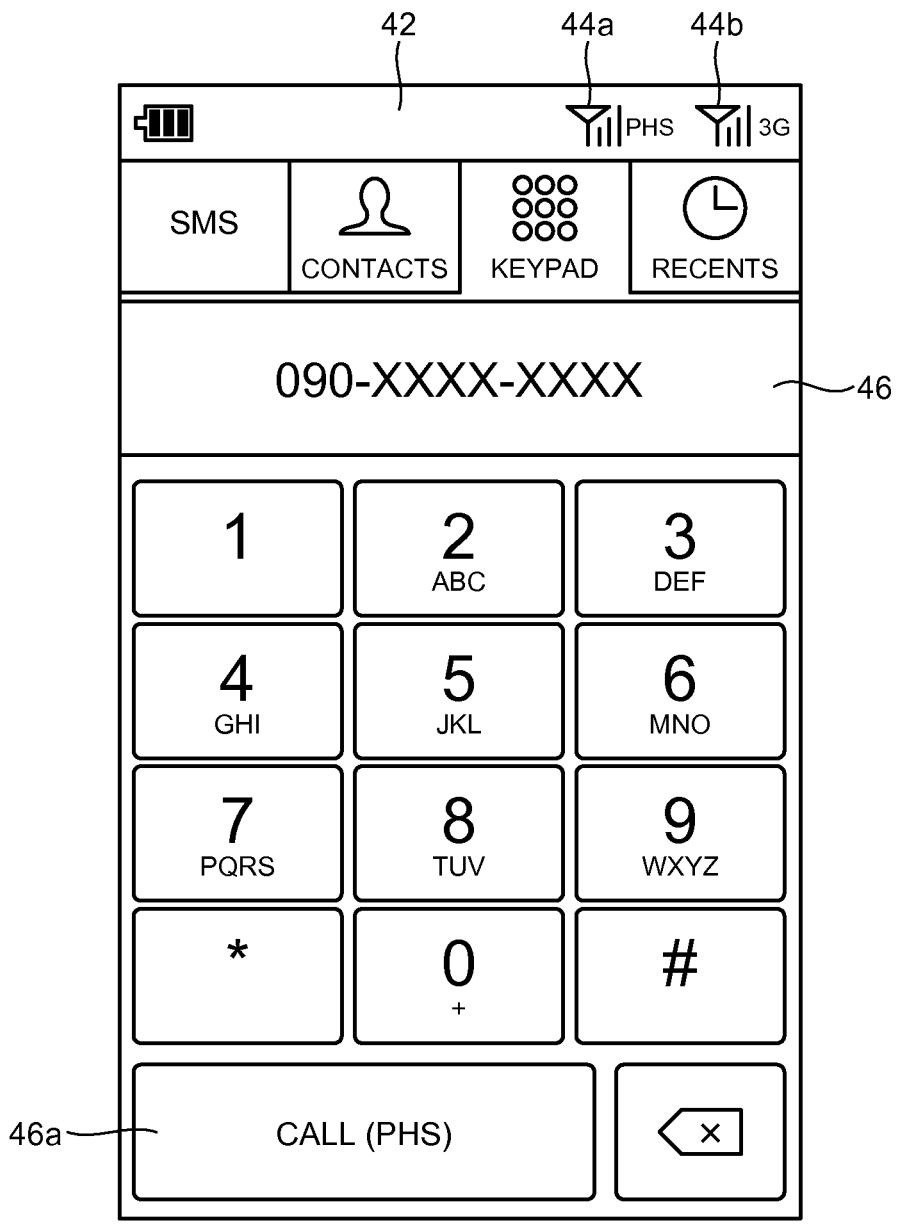
FIG. 7 is a diagram illustrating an example of a user interface for receiving an operation related to a phone call by a PHS scheme.
Figure 8:
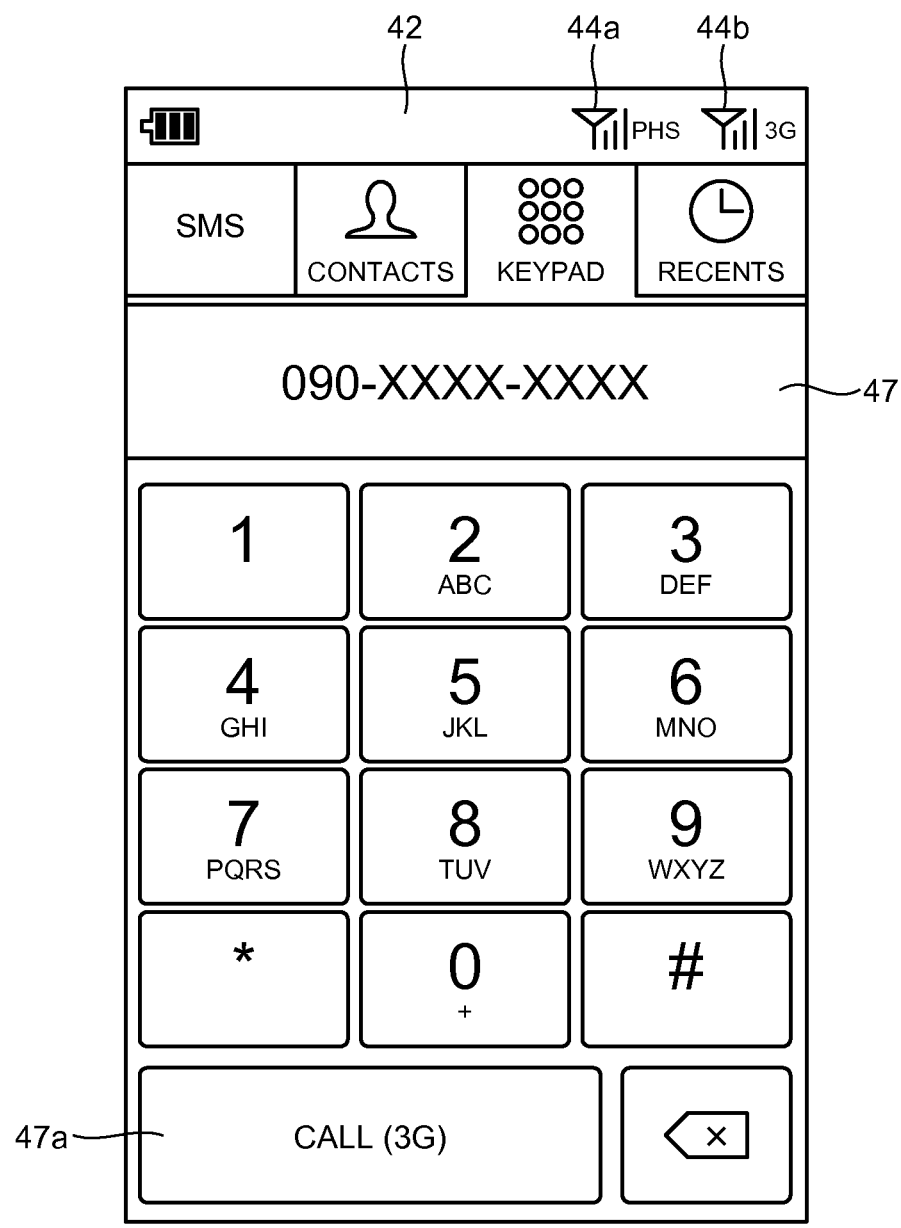
FIG. 8 is a diagram illustrating an example of a user interface for receiving an operation related to a phone call by a 3G scheme.
Figure 9:
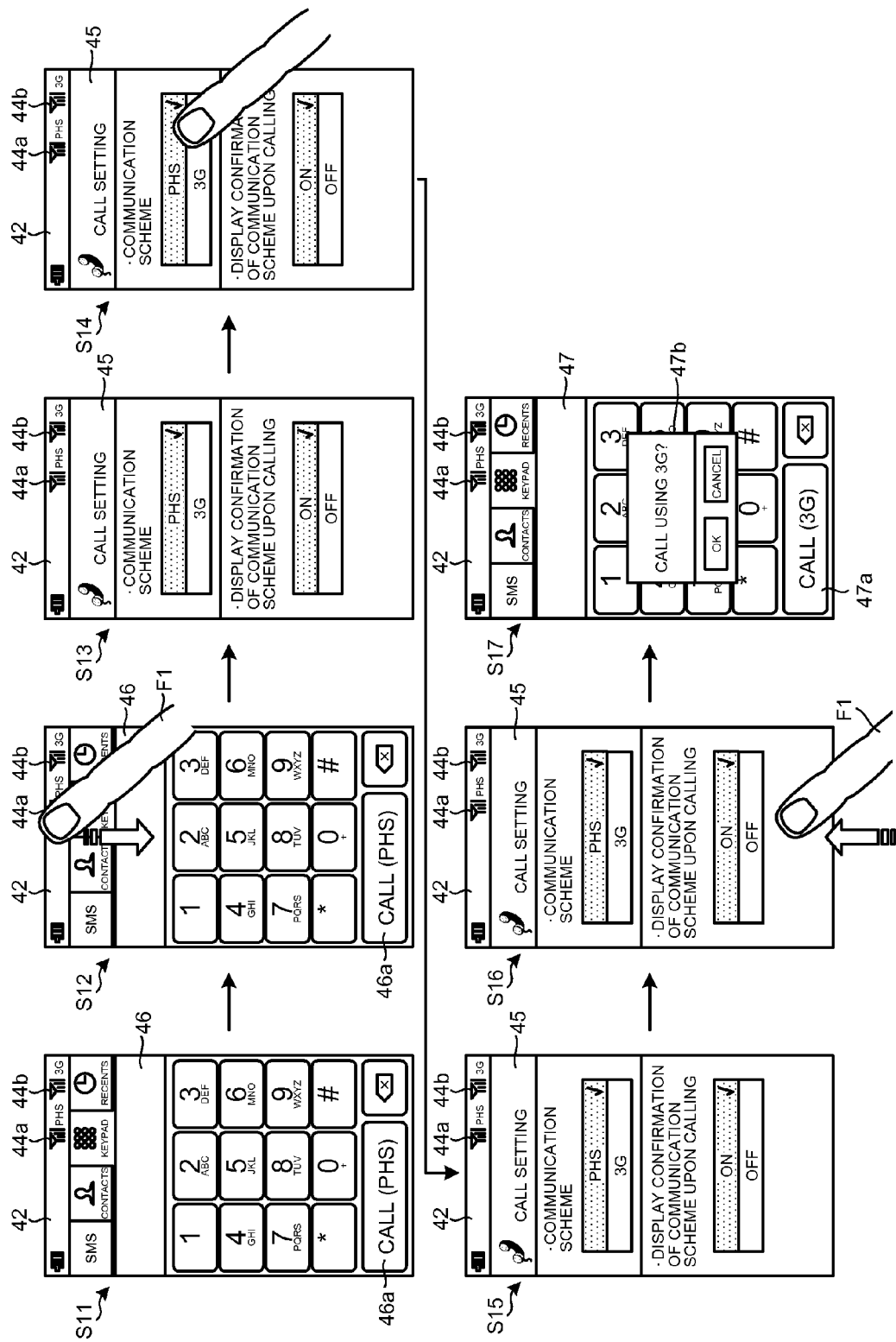
FIG. 9 is a diagram for describing an example of control based on a function provided by a control program.

A process executed in a call operation of the smartphone 1 will be described with reference to FIGS. 6 to 14. First of all, an operation when the smartphone 1 originates an outgoing call will be described with reference to FIGS. 6 to 9. FIG. 6 is a diagram illustrating an example of a phone call setting user interface displayed on a display. FIG. 7 is a diagram illustrating an example of a user interface for receiving an operation related to a phone call by the PHS scheme. FIG. 8 is a diagram illustrating an example of a user interface for receiving an operation related to a phone call by the 3G scheme. FIG. 9 is a diagram for describing an example of control based on a function provided by a control program.

The user operates a phone call setting user interface 45 illustrated in FIG. 6 to set the smartphone 1 to a communication scheme of either the PHS scheme or the 3G scheme. In other words, the user can operate the phone call setting user interface 45 illustrated in FIG. 6 to set whether or not a confirmation notice of a communication scheme at the time of call origination is to be displayed. Information related to a setting of the phone call setting user interface 45 is included in the setting data 9Z stored in the storage 9.

As illustrated in FIG. 7, a user interface 46 for receiving an operation related to a phone call by the PHS scheme includes operating portions corresponding to various kinds of functions such as a short message service (SMS), a contacts list, a keypad, and an incoming and outgoing call log. FIG. 7 illustrates an example in which the keypad is displayed on the display 2A, and an image of an operating portion 46a for performing a call origination operation is displayed as "CALL (PHS)." The user interface 46 illustrated in FIG. 7 is displayed on the display 2A through an operation for an icon corresponding to a call function when the PHS scheme is set on the phone call setting user interface 45 as the communication scheme.

FIG. 8 illustrates an example of a user interface for receiving an operation related to a phone call by the 3G scheme. As illustrated in FIG. 8, a user interface 47 for receiving an operation related to a phone call by the 3G scheme includes operating portions corresponding to various kinds of functions such as a SMS, a contacts list, a keypad, and an incoming and outgoing call log. FIG. 8 illustrates an example in which the keypad is displayed on the display 2A, and an image of an operating portion 47a for performing a call origination operation is displayed as "CALL (3G)." The user interface 47 illustrated in FIG. 8 is displayed on the display 2A through an operation for the icon corresponding to the call function when the 3G scheme is set on the phone call setting user interface 45 as the communication scheme.

The user interface 46 illustrated in FIG. 7 and the user interface 47 illustrated in FIG. 8 basically have the same configuration and differ from each other in that an image of the call button on the keypad is set according to the type of call origination.

FIG. 9 illustrates an example of control of displaying a confirmation notice on whether or not 3G call origination is to be performed on the display 2A, for example, when an operation of switching the communication scheme from the PHS scheme to 3G scheme is performed as an operation of starting 3G call origination.

Step S11 illustrated in FIG. 9 illustrates a state in which the user interface 46 for receiving the operation related to a phone call by the PHS scheme is displayed on the display 2A. Step S12 illustrated in FIG. 9 illustrates a state in which the user is about to swipe his/her finger F1 downward on the user interface 46. Step S13 illustrated in FIG. 9 illustrates a state of the display 2A in which the phone call setting user interface 45 is displayed on the display 2A immediately after swiping. Step S14 illustrated in FIG. 9 illustrates a state in which the user touches a portion indicated by "3G" on the phone call setting user interface 45 by the finger F1. Step S15 illustrated in FIG. 9 illustrates a state of the display 2A in which color of the portion indicated by "3G" on the phone call setting user interface 45 is switched immediately after touching. Step S16 illustrated in FIG. 9 illustrates a state in which the user is about to swipe the finger F1 upward on the phone call setting user interface 45. Step S17 illustrated in FIG. 9 illustrates a state, immediately after swiping, in which the user interface 47 for receiving the operation related to a phone call by the 3G scheme is displayed on the display 2A while displaying a confirmation notice 47b for urging the user to select whether or not 3G call origination is to be performed.

For example, when the operation corresponding to the call function is performed, the smartphone 1 activates the first communication unit 6A, and causes the user interface 46 to be displayed on the display 2A as illustrated in step S11.

When the operation of swiping downward on the user interface 46 is detected through the touch screen 2B as illustrated in step S12, the smartphone 1 performs a display such that the screen displayed on the display 2A is switched from the user interface 46 to the phone call setting user interface 45 as illustrated in step S13.

Then, when the operation of touching the portion indicated by "3G" on the phone call setting user interface 45 is detected through the touch screen 2B as illustrated in step S14, the smartphone 1 switches the color of 3G on the phone call setting user interface 45 as illustrated in step S15. Then, the smartphone 1 switches the communication scheme from the PHS scheme to the 3G scheme. The smartphone 1 updates the information related to the communication scheme stored in the setting data 9Z of the storage 9 from the PHS scheme to the 3G scheme.

Further, when the operation of swiping upward on the phone call setting user interface 45 is detected through the touch screen 2B as illustrated in step S16, the smartphone 1 performs a display such that the screen displayed on the display 2A is switched from the phone call setting user interface 45 to the user interface 47 while displaying the confirmation notice 47b of the 3G call origination as illustrated in step S17. When an operation on a portion indicated by "OK" on the confirmation notice 47b is detected, the smartphone 1 determines that the 3G call origination is permitted. On the other hand, when an operation on a portion indicated by "CANCEL" on the confirmation notice 47b is detected, the smartphone 1 determines that the 3G call origination is not permitted.

When a call origination operation of the call communication is input after the communication scheme used for the call communication is determined through the process illustrated in FIG. 9, the smartphone 1 executes a call origination process using the determined communication scheme, that is, using either the first communication unit 6A or the second communication unit 6B which corresponds to the determined communication scheme. When the 3G call origination is set, and the operating portion 47a is operated, it is preferable that the smartphone 1 display the confirmation notice 47b to inquire whether or not call origination is to be executed by 3G call origination again.

In this regard, it may be considered to provide a communication service capable of using both of the 3G scheme and the PHS scheme. In this communication service, fast data communication can be achieved by performing communication using the 3G scheme, and the cost can be reduced by performing communication using the PHS scheme. As described above, the smartphone 1 includes the first communication units 6A and 6B and can perform the process corresponding to communication service capable of using both of communication using the 3G scheme and communication using the PHS scheme by controlling the first communication units 6A and 6B or the like. Specifically, when the communication scheme is switched from the PHS scheme to the 3G scheme as illustrated in FIG. 9, the smartphone 1 displays the confirmation notice 47b for urging the user to select whether or not 3G call origination is to be performed. Thus, the smartphone 1 can cause the user to recognize the communication scheme again. Consequently, it is possible to cause the user to self-manage a communication fee.

Figure 10:
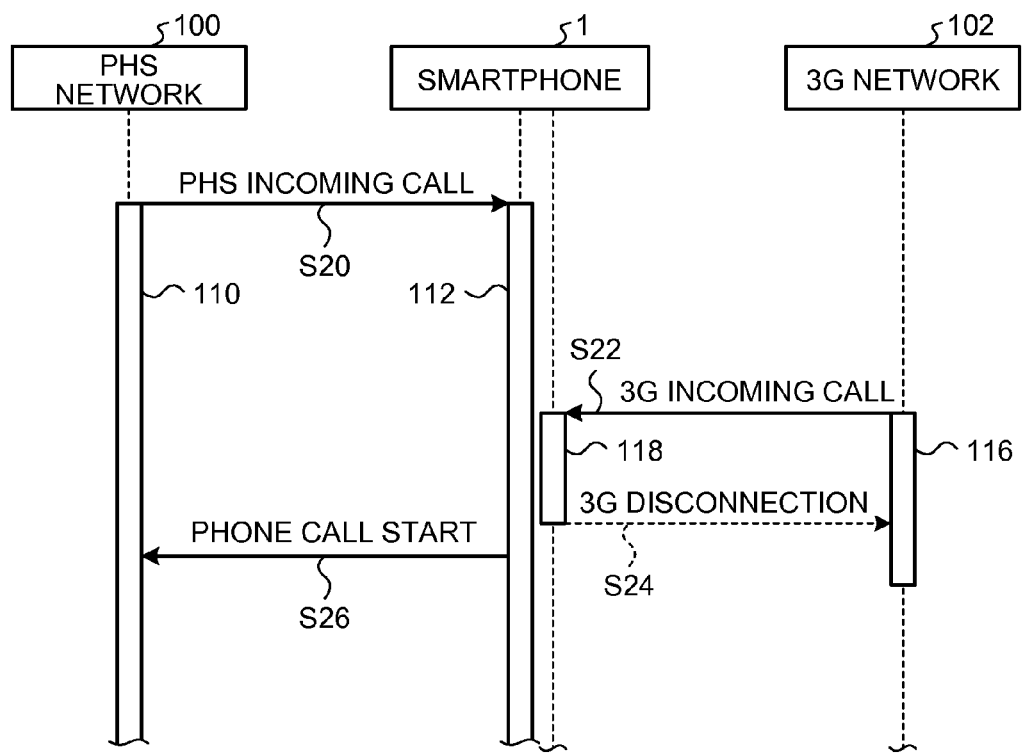
FIG. 10 is a diagram illustrating an example of control executed by the smartphone.
Figure 11:
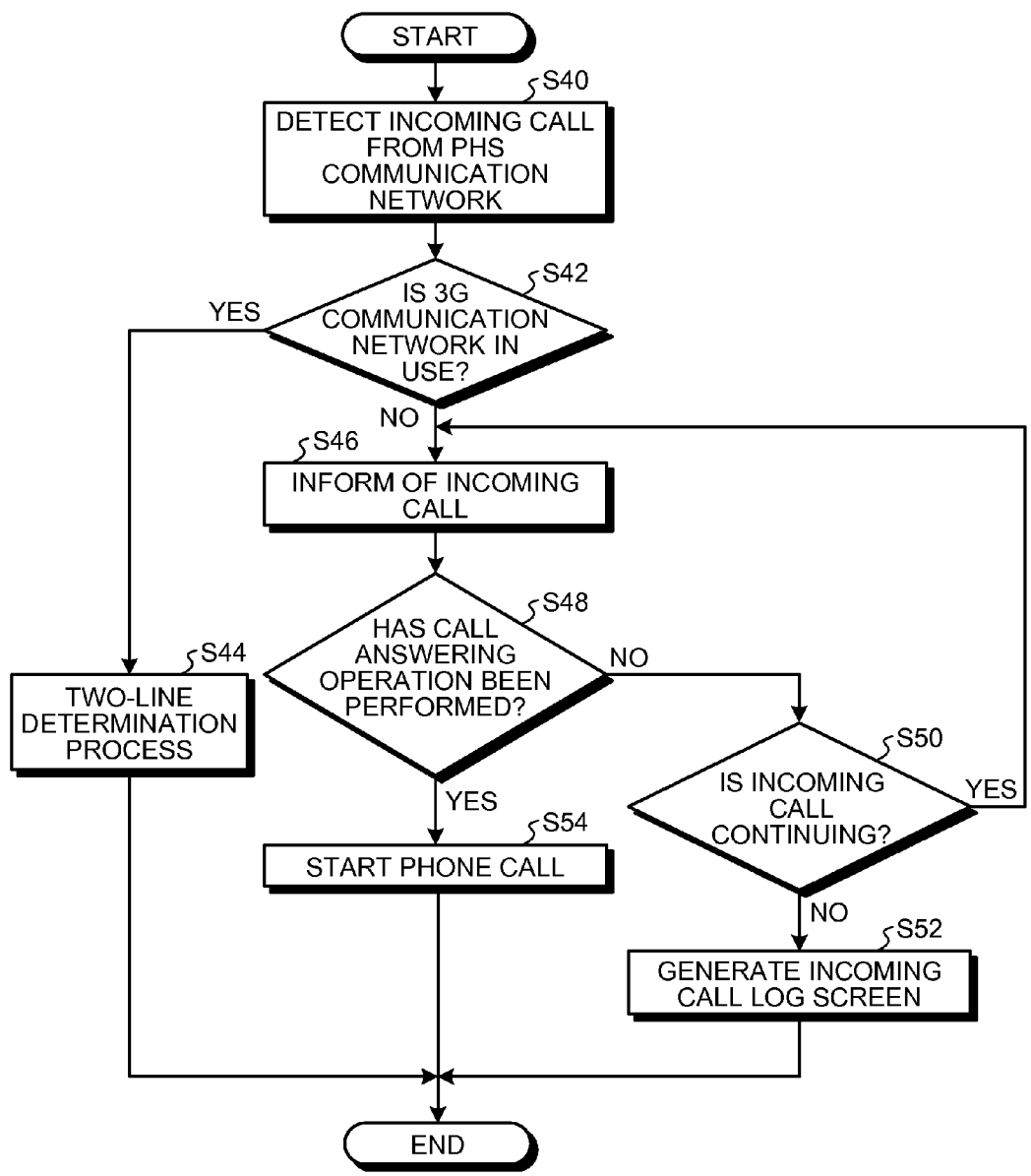
FIG. 11 is a flowchart illustrating a processing procedure of control executed by the smartphone.
Figure 12:
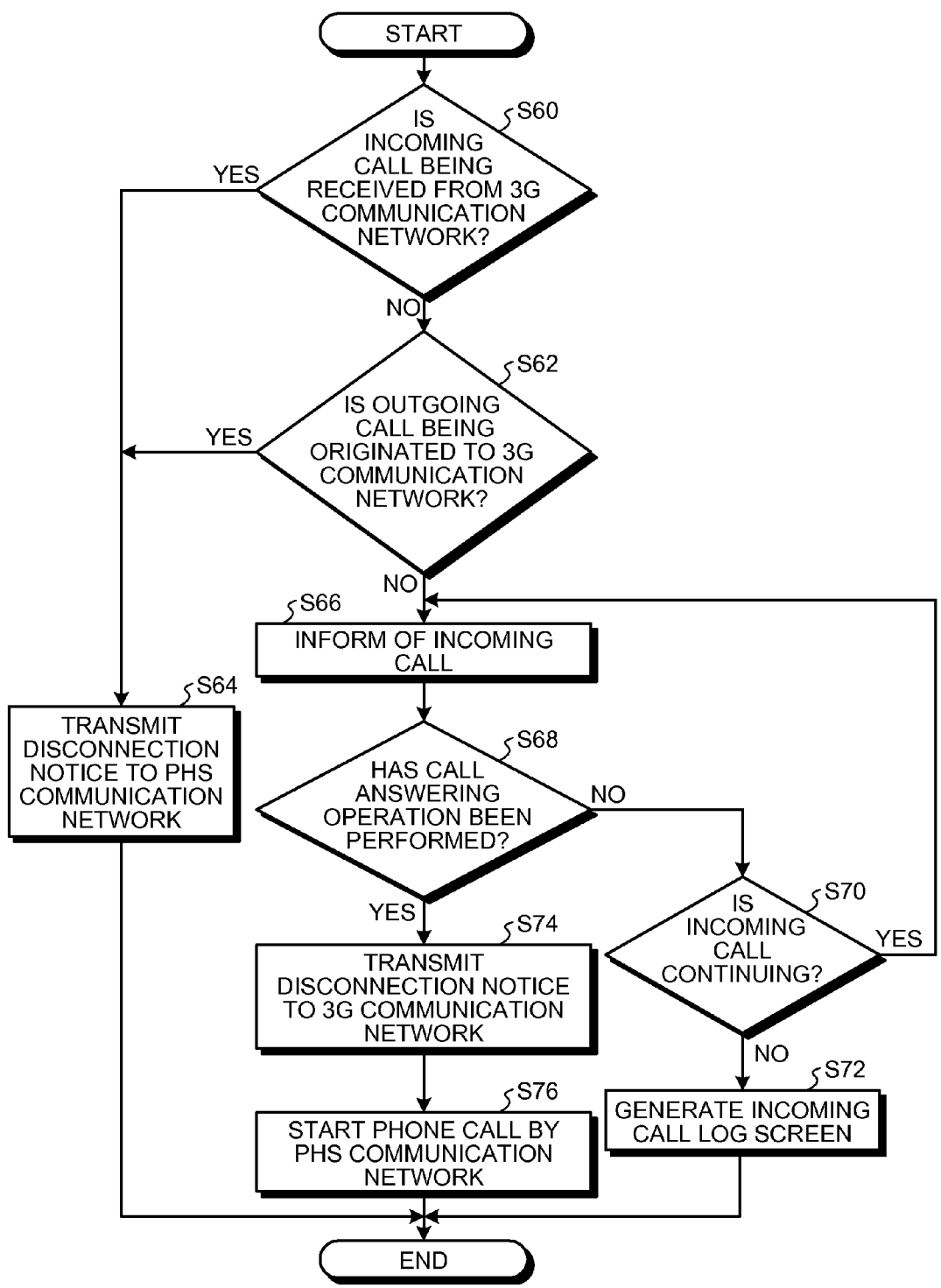
FIG. 12 is a flowchart illustrating a processing procedure of control executed by the smartphone.
Figure 13:
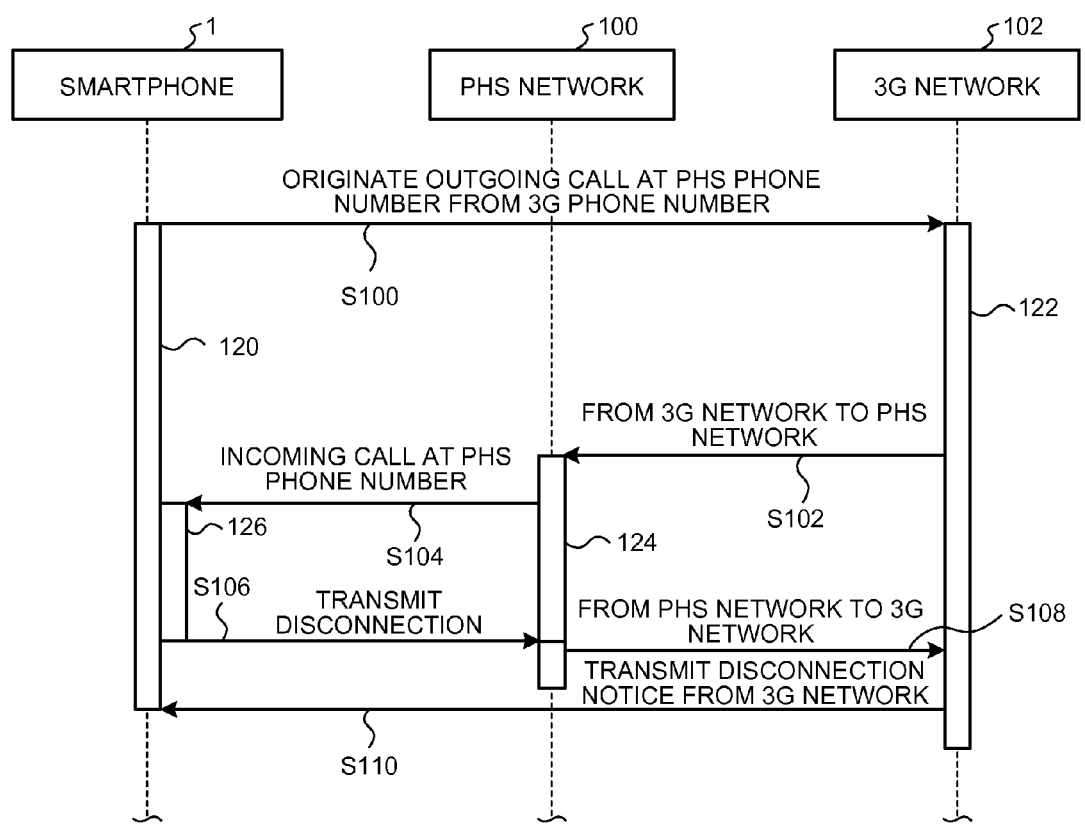
FIG. 13 is a diagram illustrating an example of control executed by the smartphone.

Next, an example of control executed by the smartphone 1 through call communication will be described with reference to FIGS. 10 to 14. FIG. 10 is a diagram illustrating an example of control executed by the smartphone according to the embodiment. FIG. 11 is a flowchart illustrating a processing procedure of control executed by the smartphone according to the embodiment. FIG. 12 is a flowchart illustrating a processing procedure of control executed by the smartphone according to the embodiment. FIG. 13 is a diagram illustrating an example of control executed by the smartphone according to the embodiment. FIG. 14 is a flowchart illustrating a processing procedure of control executed by the smartphone according to the embodiment. The processing procedure illustrating in FIGS. 10 to 14 is implemented by the controller 10 executing the control program 9A.

FIG. 10 is a diagram illustrating signals transmitted and received among the smartphone 1, a PHS network (a PHS communication network) 100, and a 3G network (a 3G communication network) 102 and whether a communication function of each unit is being executed or stopped. The PHS network 100 illustrated in FIG. 10 is a communication network in which communication is performed by the PHS scheme (a first communication scheme). The PHS network 100 includes many base stations performing communication according to the PHS scheme. In the PHS network 100, wireless communication between a communication device and a base station is performed so that the communication device can communicate with another communication device. The PHS network 100 performs communication with the first communication unit 6A of the smartphone 1, and transmits or receives a signal for call communication. Further, the PHS network 100 transfers the signal transmitted or received to or from the smartphone 1 through the base station, and transmits or receives the signal for call communication to or from another communication device (a communication device having a different phone number). As described above, the PHS network 100 performs call communication between the smartphone 1 and another communication device, and executes call communication using the first communication scheme between the smartphone 1 and another communication device.

The 3G network 102 is a communication network in which communication is performed according to the 3G scheme (a second communication scheme). The 3G network 102 includes many base stations performing communication according to the 3G scheme. In the 3G network 102, wireless communication between a communication device and a base station is performed so that the communication device can communicate with another communication device. The 3G network 102 performs communication with the second communication unit 6B of the smartphone 1, and transmits or receives a signal for a call communication. Further, the 3G network 102 transfers a signal transmitted or received to or from the smartphone 1 through the base station, and transmits or receives a call communication signal to or from another communication device (a communication device having a different phone number). As described above, the 3G network 102 performs call communication between the smartphone 1 and another communication device, and executes call communication using the second communication scheme between the smartphone 1 and another communication device.

The PHS network 100 is connected with the 3G network 102 through an exchange system, and the two communication networks can be connected with each other so that communication can be performed. The PHS network 100 and the 3G network 102 are connected with a public line through an exchange system, and can be connected with various communication networks and perform communication with communication devices connected to various communication networks. Thus, call communication can be performed even when the smartphone 1 performs communication with the PHS network 100 according to the first communication scheme to transmit or receive a call communication signal, and another communication device performs communication according to a different communication scheme to transmit or receive a call communication signal. As described above, even when another communication device performing call communication uses a different communication scheme, the smartphone 1 can change the communication scheme through the exchange system connecting the communication networks and thus perform a phone call.

FIG. 10 illustrates an example of a processing operation when the smartphone 1 receives an incoming call from the PHS network 100, that is, an incoming call of call communication and then receives an incoming call from the 3G network 102, that is, an incoming call of call communication. When call origination from another communication device to a PHS phone number of the smartphone 1 is detected, then at step S20, the PHS network 100 transmits a PHS call reception signal to the smartphone 1. When the PHS call reception signal is output to the smartphone 1 at step S20, the PHS network 100 sets communication with the smartphone 1 to an execution status as indicated by a mark 110. When PHS call reception, that is, an incoming call from the PHS network 100 is detected, the smartphone 1 sets communication with the PHS network 100 to an execution status as indicated by a mark 112. When PHS call reception is detected at step S20, the smartphone 1 executes a call reception operation. For example, the call reception operation is an operation of informing the user that a call is received from another communication device via the PHS network 100, and displaying a screen for inputting a call answering operation.

Thereafter, when call origination from another communication device to a 3G phone number of the smartphone 1 is detected, then at step S22, the 3G network 102 transmits a 3G call reception signal to the smartphone 1. When the 3G call reception signal is output to the smartphone 1 at step S22, the 3G network 102 sets communication with the smartphone 1 to an the execution status as indicated by a mark 116.

When 3G call reception, that is, an incoming call from the 3G network 102 is detected, the smartphone 1 sets communication with the 3G network 102 to an the execution status as indicated by a mark 118. When 3G call reception is detected at step S22, the smartphone 1 determines a communication status with the PHS network 100, that is, a control status of the first communication unit 6A. The smartphone 1 determines that PHS call reception is continuing, that is, that the call receiving operation is continuing, and outputs a 3G disconnection signal to the 3G network 102 at step S24. The 3G disconnection is a signal representing that call communication from the smartphone 1 to the 3G network is not allowed. When the 3G disconnection signal is output at step S24, the smartphone 1 sets communication with the 3G network 102 to a stopped status. Upon receiving the 3G disconnection signal from the smartphone 1 at step S24, the 3G network 102 sets communication with the smartphone 1 to a stopped status as indicated by a mark 116.

Thereafter, when the call answering operation is detected, then at step S26, the smartphone 1 starts communication using the PHS network 100. In other words, the smartphone 1 starts communication with the other side that has made a phone call using the PHS phone number.

As illustrated in FIG. 10, when an incoming call from one communication network is detected and then an incoming call from another communication network is detected, the smartphone 1 transmits a signal for disconnecting communication to an incoming call from another communication network. In other words, when one communication unit is in the process of an incoming call, the smartphone 1 gives a notice of disapproval to an incoming call detected by another communication unit. Thus, an operation of the smartphone 1 with the two communication units, that is, the first communication unit 6A and the second communication unit 6B can be simplified, and operability can be improved. FIG. 10 has been described in connection with the example in which the smartphone 1 simultaneously detects incoming calls through the two communication units, that is, the first communication unit 6A and the second communication unit 6B, but the control is not limited thereto. When an incoming call is detected by one communication unit, the smartphone 1 may perform control based on the communication status of another communication unit.

A control operation when the smartphone 1 detects an incoming call will be described with reference to FIGS. 11 and 12. FIGS. 11 and 12 will be described in connection with the process when an incoming call (call reception) from the PHS communication network is detected, but a similar process is performed even when an incoming call from the 3G communication network is detected.

When an incoming call from the PHS communication network is detected by the first communication unit 6A at step S40, then at step S42, the controller 10 determines whether the 3G communication network is in use. "The 3G communication network is in use" refers to a state in which a call connection signal is being transmitted and received between the second communication unit 6B and the 3G communication network 102. The transmission and reception of the call connection signal do not include communication of a polling process for searching a base station that reacts to the signal. For example, the transmission and reception of the call connection signal includes transmission and reception of a signal executed by a call reception process, a call process, and a call origination process.

When it is determined that the 3G communication network is in use at step S42 (Yes at step S42), then at step S44, the controller 10 executes a two-line determination process, and then ends the current process. The two-line determination process will be described below.

When it is determined that the 3G communication network is not in use at step S42 (No at step S42), then at step S46, the controller 10 informs the user of an incoming call. In other words, the controller 10 executes the above-described call reception operation. The smartphone 1 may use a method other than a method of giving a notice on the above-described screen as the call reception operation. In other words, the smartphone 1 may employ various means capable of informing the user of an incoming call as an informing unit driven by the call reception operation. For example, the smartphone 1 may use a vibrator 19 as an informing unit and set an operation of vibrating the housing by the vibrator 19 as the call reception operation. The smartphone 1 may use the speaker 11 as an informing unit and set an operation of outputting a sound informing of an incoming call from the speaker 11, that is, a so-called ringtone as the call reception operation.

After informing the user of an incoming call at step S46, then at step S48, the controller 10 determines whether or not a call answering operation has been performed, that is, whether or not a call answering operation has been detected. When it is determined that call answering operation has not been performed at step S48 (No at step S48), then at step S50, the controller 10 determines whether or not an incoming call is continuing. When it is determined that an incoming call is continuing at step S50, that is, when it is determined that an incoming call signal from the PHS communication network has not stopped (Yes at step S50), the controller 10 proceeds to step S46. When it is determined that an incoming call is not continuing at step S50, that is, when it is determined that an incoming call signal from the PHS communication network has stopped (No at step S50), then at step S52, the controller 10 generates an incoming call log screen, and then ends the current process. In other words, when the incoming call from the PHS communication network 100 has stopped in a state in which the call answering operation is not detected, the controller 10 generates the incoming call log screen displaying information related to an incoming call which is not answered by the user. The incoming call log screen includes a phone number which is information of a terminal which has originated an outgoing call corresponding to an incoming call, and an incoming call date and time. Further, the controller 10 generates a pop-up screen indicating the presence of an incoming call which has not been answered by the user, that is, a so-called missed call, and causes the pop-up screen to be displayed on the touch screen display 2.

When it is determined that the call answering operation has been performed at step S48 (Yes at step S48), then at step S54, the controller 10 starts a phone call, and then ends the current process. In other words, when the call answering operation is detected, the controller 10 starts a phone call with another communication device corresponding to an incoming call from the PHS communication network 100 using the first communication unit 6A and the PHS communication network 100.

The two-line determination process will be described with reference to FIG. 12. The two-line determination process refers to a process executed when one communication network is in use at the time of detection of an incoming call from another communication network. At step S60, the controller 10 determines whether or not an incoming call is being received from the 3G communication network. When it is determined that an incoming call is being received from the 3G communication network at step S60 (Yes at step S60), the controller 10 proceeds to step S64. When it is determined that an incoming call is not being received from the 3G communication network at step S60 (No at step S60), then at step S62, the controller 10 determines whether or not an outgoing call is being originated to the 3G communication network.

When it is determined that an outgoing call is being originated to the 3G communication network at step S62 (Yes at step S62), the controller 10 proceeds to step S64. When Yes is determined at step S60 or S62, that is, when it is determined that an incoming call is being received from the 3G communication network or when it is determined that an outgoing call is being originated to the 3G communication network, then at step S64, the controller 10 gives the disconnection notice to the PHS communication network, and then ends the current process. In other words, in a state in which communication for a phone call with the 3G communication network is being performed but the phone call does not start, the controller 10 gives the disconnection notice to the PHS communication network while maintaining communication for the phone call with the 3G communication network.

When it is determined that an outgoing call is not being originated to the 3G communication network at step S62 (No at step S62), then at step S66, the controller 10 informs the user of an incoming call. In other words, when it is determined that an outgoing call is not being originated to the 3G communication network and an incoming call is not being received from the 3G communication network, the controller 10 determines that call communication is being performed, and executes the above-described call reception operation. In this case, the controller 10 executes the call reception operation on the incoming call from the PHS communication network while maintaining the call communication which is being executed via the 3G communication network.

When the incoming call is informed at step S66, then at step S68, the controller 10 determines whether or not the call answering operation has been performed. When it is determined that the call answering operation has not been performed at step S68 (No at step S68), then at step S70, the controller 10 determines whether or not the incoming call is continuing. When it is determined that the incoming call is continuing at step S70, that is, when it is determined that the incoming call signal from the PHS communication network has not stopped (Yes at step S70), the controller 10 proceeds to step S66. When it is determined that the incoming call is not continuing at step S70, that is, when it is determined that the incoming call signal from the PHS communication network has stopped (No at step S70), then at step S72, the controller 10 generates the incoming call log screen, and then ends the current process. In other words, when the incoming call from the PHS communication network 100 stops without detecting the call answering operation, the controller 10 generates the incoming call log screen displaying information related to an incoming call which has not been answered by the user. In this case, the controller 10 displays the incoming call log screen after ending the call communication using the 3G communication network or displaying the pop-up screen for moving to the incoming call log screen.

When it is determined that the call answering operation has been performed at step S68 (Yes at step S68), then at step S74, the controller 10 gives the disconnection notice to the 3G communication network. Then, at step S76, the controller 10 starts a phone call through the PHS communication network, and then ends the current process. In other words, when the call answering operation is detected, the controller 10 gives the disconnection notice to the 3G communication network 102, and ends the call communication using the second communication unit 6B and the 3G communication network 102. Further, the controller 10 starts the call communication with another communication device corresponding to the incoming call from the PHS communication network using the first communication unit 6A and the PHS communication network 100.

When an incoming call from one communication network is detected by one communication unit, the smartphone 1 controls the process on the incoming call detected by one communication unit based on the status of another communication unit (or the communication status of another communication network). Thus, the smartphone 1 can control communication in the state in which the user can easily operate even when the smartphone 1 is configured to execute call communication separately by the two communication units. Further, the smartphone 1 can control communication with the two communication network through the smartphone 1, and can reduce a load on the communication network. Further, since communication with the two communication networks can be controlled by the smartphone 1, the call communication can be controlled according to the purpose of use of the smartphone 1. Furthermore, the smartphone 1 performs the above control through the controller 10, and thus can process 3G and PHS incoming calls while an incoming call from another system is being received without modifying the present 3G and PHS systems.

According to the present embodiment, when the incoming call from one communication network is detected by one communication unit while another communication unit is originating an outgoing call to another communication network, the smartphone 1 disconnects the incoming call through one communication unit. Specifically, the notice representing that the incoming call detected by one communication unit is not allowed is given, and the incoming call is disconnected. As a result, priority can be given to an operation of starting call communication actively executed by the user, and thus call communication can be controlled according to the user's intention.

According to the present embodiment, when the incoming call from one communication network is detected by one communication unit while another communication unit is receiving an incoming call from another communication network represents, the smartphone 1 disconnects the incoming call through one communication unit. Specifically, the notice representing that the incoming call detected by one communication unit is not allowed is given, and the incoming call is disconnected. As a result, it can be prevented to inform of two incoming calls at the same time, and the user's operability can be improved.

According to the present embodiment, when the incoming call from one communication network is detected by one communication unit while another communication unit is performing a phone call through another communication network, the smartphone 1 informs of the incoming call, and in this case, the user can switch a phone call and arbitrarily sets the communication counterpart.

The smartphone 1 according to the above embodiment can switch a phone call when the incoming call from one communication network is detected by one communication unit while another communication unit is performing a phone call through another communication network, but the embodiment is not limited to this example. When the incoming from one communication network is detected by one communication unit while another communication unit is performing a phone call through another communication network, the smartphone 1 may be configured to disconnect an incoming call from one call unit. Alternatively, the smartphone 1 may be configured to change whether the incoming call from one call unit is to be disconnected or to be switched by a setting. Thus, it is possible to execute control according to the user's desire.

When an incoming call detected by one communication unit is disconnected (that is, a notice representing that an incoming call detected by one communication unit is not allowed is given) according to the call status between another communication unit and another communication network, the smartphone 1 can inform the user of the fact that there was the incoming call by storing information of the incoming call detected by one communication unit as an incoming call log. The smartphone 1 can more reliably inform the user of the incoming call detected by the communication unit by informing the user of the fact that there was the incoming call.

When the call origination is disconnected, the smartphone 1, the PHS communication network 100, and the 3G communication network 102 can output a sound such as a busy tone representing that it is difficult to use call communication. The smartphone 1 according to the above embodiment gives priority to the communication unit that is first performing communication related to call communication since it is possible to further improve the user's operability and perform the process without causing the user to get stress out, but the embodiment is not limited to this example. The settings of the smartphone 1 may be arbitrarily changed as far as the smartphone 1 control the process on an incoming call detected by one communication unit based on the status of another communication unit when the incoming call from one communication network is detected by one communication unit.

When an incoming call is received from another communication device while communication related to call communication is being performed by one communication unit, the smartphone 1 executes the process through one communication network. In other words, when a plurality of call communications are likely to overlap on the smartphone 1 to which one more phone number is added, servers of communication networks adjust call lines.

By executing the above process, the smartphone 1 can prevent call communication from being made from one communication unit of the smartphone 1 to another communication unit of the smartphone 1. The explanation will be given with reference to FIGS. 13 and 14.

At step S100, the smartphone 1 originates an outgoing call at a phone number (a PHS phone number) of PHS of the smartphone 1 from a phone number (a 3G phone number) of 3G of the smartphone 1. In other words, an outgoing call is originated at the PHS phone number of the smartphone 1 using the second communication unit 6B. When the outgoing call is originated at the PHS phone number of the smartphone 1 using the second communication unit 6B at step S100, the smartphone 1 sets communication with the 3G network 102 to the execution status as indicated by a mark 120.

When the call origination from the 3G phone number of the smartphone 1 is detected, the 3G network 102 sets communication with the smartphone 1 to the execution status as indicated by a mark 122. Thereafter, the 3G network 102 specifies the PHS phone number which is the destination of the originated call from the smartphone 1, and then at step S102, an incoming call signal is transmitted from the 3G network 102 to the PHS network 100. In other words, at step S102, the 3G network 102 informs the PHS network 100 of the originated call from the 3G phone number of the smartphone 1 to the PHS phone number of the smartphone 1. In other words, the 3G network 102 transmits a signal for informing of the fact that a phone call is made from the 3G phone number of the smartphone 1 to the PHS phone number of the smartphone 1 included in the PHS network 100 to the PHS network 100. When the incoming call at the PHS phone number of the smartphone 1 is detected at step S102, the PHS network 100 sets communication with the smartphone 1 to the execution status as indicated by a mark 124.

When the call origination from the 3G network 102 to the PHS phone number of the smartphone 1 is detected at step S102, then at step S104, the PHS network 100 transmits a PHS call reception signal to the smartphone 1. When PHS call reception, that is, the incoming call from the PHS network 100 is detected at step S104, the smartphone 1 sets communication with the PHS network 100 to the execution status as indicated by a mark 126.

When the PHS call reception is detected at step S104, the smartphone 1 determines the communication status with the 3G network 102, that is, the control status of the second communication unit 6B. In this case, the smartphone 1 determines that 3G call origination is continuing, that is, the call origination operation is continuing, and then at step S106, transmits a disconnection signal to the PHS network 100. The disconnection signal in this case is a signal by which the smartphone 1 notifies the PHS network 100 that call communication is not allowed. When the PHS disconnection signal is output at step S106, the smartphone 1 sets communication with the PHS network 100 to the stopped status. Upon receiving the disconnection signal from the smartphone 1 at step S106, then at step S108, the PHS network 100 notifies the 3G network 102 of the disconnection, that is, outputs the disconnection signal to the 3G network 102. The disconnection signal of step S108 is a signal by which the PHS network 100 notifies the 3G communication network 102 that call communication with the smartphone 1 is not allowed. When a predetermined period of time elapses after the disconnection signal transmitted from the smartphone 1 is received and the disconnection signal is output to the 3G network 102, the PHS network 100 sets communication with the smartphone 1 to the stopped status as indicated by a mark 124.

When the disconnection signal is received from the PHS network 100 at step S108, then at step S110, the 3G network 102 notifies the smartphone 1 of the disconnection, that is, outputs the disconnection signal to the smartphone 1. The disconnection signal of step S110 is a signal by which the 3G communication network 102 notifies the smartphone 1 that call communication originated by the smartphone 1 is not allowed. When a predetermined period of time elapses after the disconnection signal transmitted from the PHS network 100 is received and the disconnection signal is output to the smartphone 1, the 3G network 102 sets communication with the smartphone 1 to the stopped status as indicated by a mark 122. When the disconnection notice transmitted from the 3G network 102 is received at step S110, the smartphone 1 sets communication with the 3G network 102 to the stopped status as indicated by a mark 120.

A control operation executed by the smartphone 1 at the time of the process of FIG. 13 will be described with reference to FIG. 14. At step S120, the controller 10 detects a call origination operation from the 3G phone number of the smartphone 1 input by the user to the PHS phone number of the smartphone 1. When the call origination operation is detected at step S120, then at step S122, the controller 10 starts the call origination process on the 3G communication network. In other words, the controller 10 outputs a call origination processing signal of call communication directed to the 3G communication network 102 using the second communication unit 6B. When the call origination process starts at step S122, then at step S124, the controller 10 detects an incoming call from the PHS communication network. In other words, the controller 10 detects an incoming call from the PHS communication network 100 through the first communication unit 6A.

When the incoming call is detected by the first communication unit 6A at step S124, the controller 10 detects the status of the second communication unit 6B, and then at step S126, determines that an outgoing call is being originated to the 3G communication network. In other words, the controller 10 determines that the second communication unit 6B is performing the call origination directed to the 3G communication network which is started at step S122. Thereafter, at step S128, the controller 10 transmits a disconnection notice to the PHS communication network based on the determination that the call origination directed to the 3G communication network is being performed. Further, the controller 10 detects that the phone number of the caller matches the phone number whose outgoing call is being originated based on information of the call origination directed to the disconnected PHS phone number, and then at step S130, detects the disconnection notice from the 3G communication network. When the disconnection notice from the 3G communication network is detected at step S130, then at step S132, the controller 10 displays information representing that a phone call is not allowed on the touch screen display 2, outputs a busy tone from the receiver 7, and then ends the current process. Instead of detecting the disconnection notice at step S130, the smartphone 1 may be configured specify a communication target, and to display information representing that a phone call is not allowed on the touch screen display 2 and output a busy tone from the receiver 7 when it is specified that an outgoing call is originated from the phone number of the communication unit of the smartphone 1.

When an incoming call from one communication network is detected by one communication unit, the smartphone 1 controls the process on the incoming call detected by one communication unit based on the status of another communication unit. More specifically, when an incoming call from one communication network is detected by one communication unit while another communication unit is originating a call to another communication network, the smartphone 1 disconnects the incoming call by one communication unit. Thus, the smartphone 1 can prevent a phone call from being made from the phone number of one communication unit of the smartphone 1 to the phone number of another communication unit of the smartphone 1 as illustrated in FIGS. 13 and 14. Thus, even when the separate phone numbers are used by the two communication units, it is possible to suppress non-useful communication from being established and to improve the user's operability. Further, since communication is automatically disconnected, the smartphone 1 can suppress a non-useful call from being continued to increase a load of a communication network.

In the examples of FIGS. 13 and 14, communication of the smartphone 1 is stopped by transmitting the disconnection notice from the PHS network 100 to the 3G network 102 and transmitting the disconnection notice from the 3G network 102 to the smartphone 1, but the embodiment is not limited thereto. When it is detected that the phone number of the caller (that is, the phone number assigned to one communication unit of the smartphone 1) matches the phone number of the phone which is originating a call (that is, the phone number of the call origination side of the call communication in which an incoming call arrives) based on information of the origination of the call directed to the disconnected PHS phone number, the smartphone 1 may transmit the disconnection (3G disconnection) notice to the 3G network 102. In other words, the smartphone 1 may compare the phone numbers through the controller 10 and output the disconnection signal even from the communication unit which is performing call origination. In this case, the smartphone 1 outputs the disconnection signal to the 3G network 102 in a direction reverse to step S110 of FIG. 13. Further, when the disconnection signal is output to the 3G network 102, the smartphone 1 sets the communication with the 3G network 102 to the stopped status. When the disconnection signal is received from the smartphone 1 and a predetermined period of time elapses, the 3G network 102 sets the communication with the smartphone 1 to the stopped status as indicated by a mark 122.

In addition, at step S130 of the process of FIG. 14, the smartphone 1 transmits the disconnection notice to the 3G communication network, then at step S132, displays information representing that a phone call is not allowed on the touch screen display 2 and outputs a busy tone through the receiver 7, and then ends the current process. In this way, the smartphone 1 checks the phone number of the communication target, and transmits the disconnection notice to the communication network of the call origination side, and thus similarly to the above embodiment, call communication can be appropriately controlled by the two communication units, and it is possible to prevent a phone call from being made from the phone number of one communication unit of the smartphone 1 to the phone number of another communication unit of the smartphone 1. Further, the smartphone 1 performs the determination and transmits the disconnection notice to the two communication networks, and thus it is possible to process 3G and PHS incoming calls which are being received from different systems, without modifying the present system of the 3G communication scheme and the system of the PHS communication scheme.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen; however, the device according to the appended claims is not limited to the smartphone. The device according to the appended claims may be a mobile communication device other than the smartphone, for example, a mobile communication having a plurality of communication unit. Examples of the mobile communication devices include, but are not limited to, mobile phones, tablets, mobile personal computers, digital cameras, media players, electronic book readers, navigators, and gaming devices. The communication device according to the appended claims may be a stationary-type communication device. Examples of the stationary-type communication devices include, but are not limited to, desktop personal computers, and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication device, comprising:
   a touch screen display;
   a PHS transceiver configured to perform communication using a PHS scheme;
   a 3G transceiver configured to perform communication using a 3G scheme; and
   a controller configured to process a first incoming call received at the PHS transceiver based on a status of the 3G transceiver, wherein when a call button is displayed on the touch screen display, the controller is configured to cause the touch screen display to display an indicator on said call button, wherein
said indicator indicates the PHS scheme when the communication device is set to use the PHS scheme, and
said indicator indicates the 3G scheme when the communication device is set to use the 3G scheme, and
in response to a downward swipe gesture performed on a screen on which the call button and the indicator are displayed by the touch screen display,
the controller is configured to cause the touch screen display to display an interface for selecting one of the PHS scheme and the 3G scheme to be used by the communication device, and
in response to an upward swipe gesture performed on a phone call setting user interface displayed on the touch screen display when one of the PHS scheme and the 3G scheme has been selected,
the controller is configured to cause the touch screen display to display a confirmation notice asking a user to select whether a call origination using the selected communication scheme is to be performed by the communication device.

2. The communication device according to claim 1, wherein
when the 3G transceiver is establishing a second call but the second call has not been started yet, the controller is configured to process the first incoming call in a first operation, and
when the 3G transceiver is performing the second call that has been started, the controller is configured to process the first incoming call in a second operation different from the first operation.

3. The communication device according to claim 2, wherein
the controller is configured to transmit a notice, which represents that a third incoming call is not allowed, to a first network in response to receipt of the third incoming call from the first network at the PHS transceiver while the 3G transceiver is originating an outgoing call.

4. The communication device according to claim 2, wherein
the controller is configured to
acquire information of the first incoming call, and
notify a user of the communication device of the information of the first incoming call after the 3G transceiver ends the second call.

5. The communication device according to claim 3, wherein
the controller is configured to
acquire information of the third incoming call, and
notify a user of the communication device of the information of the third incoming call after the 3G transceiver ends the outgoing call.

6. The communication device according to claim 2, wherein
in the second operation, the controller is configured to inform a user of the communication device of the first incoming call received at the PHS transceiver via a first network when the 3G transceiver is performing the second call.

7. The communication device according to claim 6, wherein when a phone call operation corresponding to the first incoming call is detected,
the controller is configured to
end the second call being executed by the 3G transceiver, and
start communication corresponding to the first incoming call detected by the PHS transceiver.

8. The communication device according to claim 2, wherein
n the first operation, the controller is configured to transmit a notice, which indicates that the first incoming call is not allowed, to a first network in response to receipt of the first incoming call from the first network by the PHS transceiver during a period from (i) a time at which the 3G transceiver receives the second call incoming from a second network to (ii) a time at which the 3G transceiver starts communication corresponding to the second call over the second network.

9. The communication device according to claim 2, wherein
n the first operation, the controller is configured to transmit a notice, which indicates that the first incoming call is not allowed, to a first network in response to receipt of the first incoming call from the first network by the PHS transceiver during a period from (i) a time at which the 3G transceiver originates the second call outgoing to a second network to (ii) a time at which the 3G transceiver starts communication corresponding to the second call over the second network.

10. The communication device according to claim 1, wherein the controller is configured to cause the touch screen display to display the call button and the indicator in an area separated from a phone number to be called using a current communication scheme set to be used by the communication device.

11. The communication device according to claim 1, wherein the controller is configured to cause the touch screen display to display a keypad between (i) a phone number to be called using a current communication scheme set to be used by the communication device and (ii) the call button and the indicator.

12. The communication device according to claim 1, wherein the controller is configured to cause the touch screen display to display, in response to the call button being operated, a confirmation notice to inquire whether or not call origination is to be executed using a current communication scheme set to be used by the communication device.

13. The communication device according to claim 1, wherein
when the 3G transceiver is establishing a second call but the second call has not been started yet, the controller is configured to process the first incoming call in a first operation, and
when the 3G transceiver is performing the second call that has been started, the controller is configured to cause the PHS transceiver to respond to the first incoming call in a second operation different from the first operation.

14. A communication method of a communication device including a touch screen display, a PHS transceiver for performing communication with a first network using a PHS scheme, and a 3G transceiver for performing communication with a second network using a 3G scheme, the communication method comprising:
detecting a first incoming call by the PHS transceiver;
detecting a status of the 3G transceiver upon detecting the first incoming call; and processing the first incoming call received at the PHS transceiver based on the status of the 3G transceiver, wherein
when a call button is displayed on the touch screen display, an indicator is also displayed on said call button, wherein
said indicator indicates the PHS scheme when the communication device is set to use the PHS scheme, and
said indicator indicates the 3G scheme when the communication device is set to use the 3G scheme, and
in response to a downward swipe gesture performed on a screen on which the call button and the indicator are displayed by the touch screen display,
the touch screen display displays an interface for selecting one of the PHS scheme and the 3G scheme to be used by the communication device, and
in response to an upward swipe gesture performed on a phone call setting user interface displayed on the touch screen display when one of the PHS scheme and the 3G scheme has been selected,
configuring a controller to cause the touch screen display to display a confirmation notice asking a user to select whether a call origination using the selected communication scheme is to be performed by the communication device.

15. A non-transitory storage medium that stores a communication program for causing, when executed by a communication device including a touch screen display, a PHS transceiver for performing communication with a first network using a PHS scheme, and a 3G transceiver for performing communication with a second network using a 3G scheme, the communication device to execute:
detecting a first incoming call by the PHS transceiver;
detecting a status of the 3G transceiver upon detecting the first incoming call; and
processing the first incoming call received at the PHS transceiver based on the status of the 3G transceiver, wherein
when a call button is displayed on the touch screen display, an indicator is also displayed on said call button, wherein
said indicator indicates the PHS scheme when the communication device is set to use the PHS scheme, and
said indicator indicates the 3G scheme when the communication device is set to use the 3G scheme, and
in response to a downward swipe gesture performed on a screen on which the call button and the indicator are displayed by the touch screen display,
the touch screen display displays an interface for selecting one of the PHS scheme and the 3G scheme to be used by the communication device, and
in response to an upward swipe gesture performed on a phone call setting user interface displayed on the touch screen display when one of the PHS scheme and the 3G scheme has been selected,
configuring a controller to cause the touch screen display to display a confirmation notice asking a user to select whether a call origination using the selected communication scheme is to be performed by the communication device.

* * * * *